Oct. 19, 1948.  D. E. SWINEHART  2,451,698
EXTENSION TONGUE
Filed Oct. 17, 1947
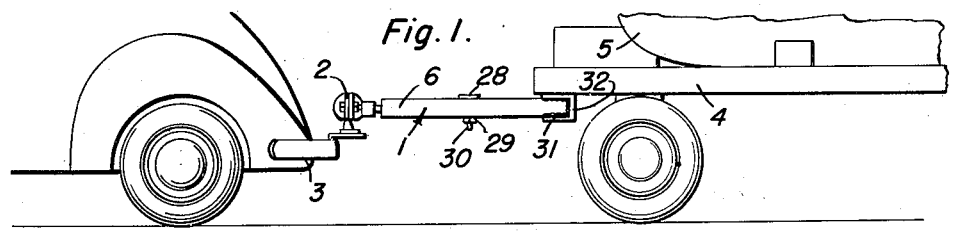
Fig. 1.
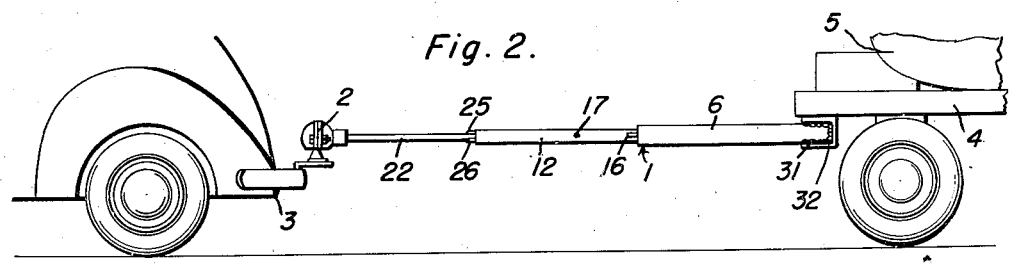
Fig. 2.
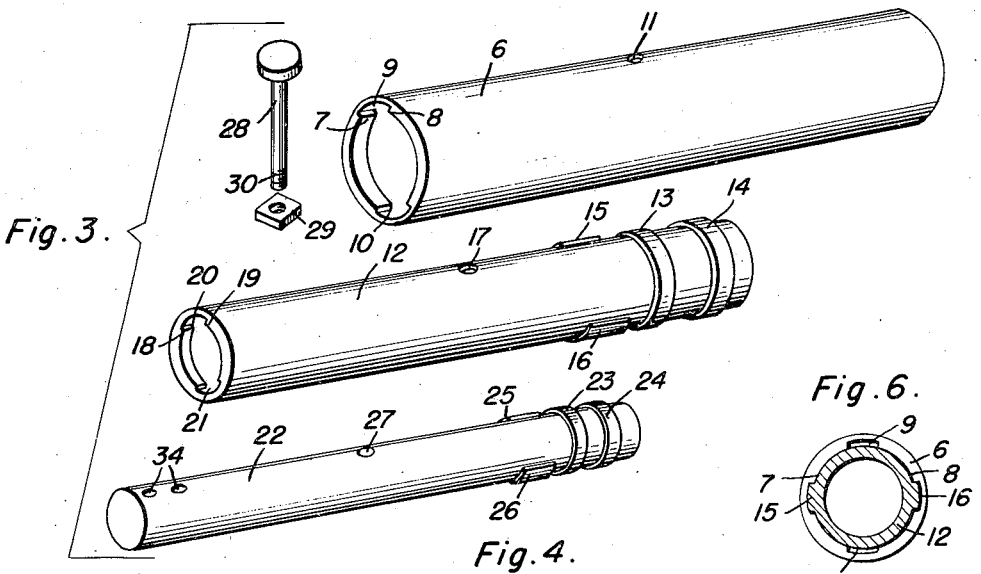
Fig. 3.
Fig. 4.
Fig. 6.
Fig. 5.
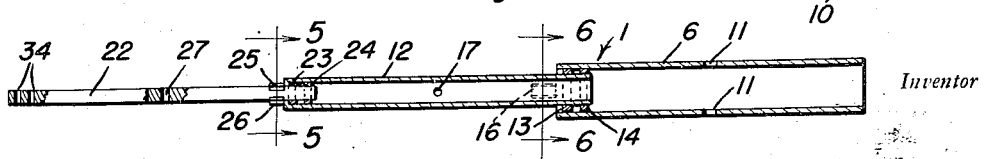
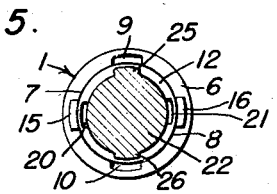
Inventor
Dean E. Swinehart
By Clarence A. O'Brien
and Harvey B. Jacobson
Attorneys Patented Oct. 19, 1948

2,451,698

UNITED STATES PATENT OFFICE 2,451,698

EXTENSION TONGUE

Dean E. Swinehart, Ravenna, Ohio

Application October 17, 1947, Serial No. 780,336

1 Claim. (Cl. 280—33.14)

This invention relates to an improved extension tongue for boat trailers.

An object of the invention is to provide an improved extension tongue for a boat trailer which will comprise a plurality of interconnected tongue sections held in telescoped position when the trailer is being hauled, and which may be extended when the trailer, with a boat supported on it, is being moved into or out of water for launching the boat or for removing the same from the water.

Another object of the invention is to provide an improved telescoping sectional extension tongue for a boat trailer having the front end of the smallest section attached to a trailer hitch on the rear of a motor vehicle, and the rear end of the largest section fixed to the trailer, said sections being positively held in telescoped position while the motor vehicle is hauling the boat trailer, and said sections being extended while the boat carried by the trailer is being launched or removed from the water.

A further object of the invention is to provide an improved extension tongue for a boat trailer which will be highly efficient in operation and relatively inexpensive to manufacture and produce.

Other objects will appear as the description proceeds.

In the accompanying drawings which form a part of this application,

Figure 1 is a side elevation of the improved extension tongue shown in telescoped position connected between a trailer hitch on the rear of a motor vehicle and a boat trailer;

Figure 2 is a side elevation of the improved extension tongue shown in extended position connected between a trailer hitch on the rear of a motor vehicle and a boat trailer;

Figure 3 is an exploded view of the several parts forming the extension tongue for a boat trailer;

Figure 4 is a vertical longitudinal sectional view of the extended extension tongue;

Figure 5 is a sectional view taken on the line 5—5 of Figure 4; and

Figure 6 is a sectional view taken on the line 6—6 of Figure 4.

Like characters of reference are used throughout the following specification and the accompanying drawings to designate corresponding parts.

In carrying out the invention, there is provided an improved sectional telescoping extension tongue generally designated by the reference numeral 1 for connecting between a trailer hitch 2 on the rear of a motor vehicle 3 and a boat trailer 4 upon which a boat 5 will be supported and transported.

The extension tongue 1 comprises an outer tubular section 6 formed in its front end with oppositely disposed annular locking shoulders 7 and 8 and oppositely disposed slots 9 and 10 formed between the adjacent ends of said locking shoulders. Diametrically opposed locking apertures 11 are formed through the section 6 approximately midway of its length.

The intermediate tubular section 12 is provided at one end with a pair of externally disposed longitudinally spaced bearing rings 13 and 14 for slidable bearing engagement within the outer tubular section 6, and a pair of diametrically opposed locking lugs 15 and 16 are provided on the outer surface of the tubular section 12 forwardly of the bearing rings 13 and 14 for movement through the slots 9 and 10 in the outer tubular section 6 when said sections 6 and 12 are moved to extended position. Diametrically opposed locking apertures 17 are formed through the tubular section 12 for alignment with the apertures 11 when the sections 6 and 12 are in telescoped position.

The front end of the intermediate tubular section 12 is formed similarly to the front end of the outer tubular section 6, being provided with the annularly disposed locking shoulders 18 and 19 and the oppositely disposed slots 20 and 21 formed between the adjacent ends of said shoulders.

An inner solid rod section 22 is telescopically received within the intermediate tubular section 12, and is provided at its rear end with a pair of externally disposed longitudinally spaced bearing rings 23 and 24 for slidable bearing engagement in the intermediate tubular section 12, and a pair of diametrically opposed locking lugs 25 and 26 are provided on the outer surface of the solid rod section 22 forwardly of the bearing rings 23 and 24 for movement through the slots 20 and 21 in the front end of the intermediate tubular section 12 when said section 12 and the solid rod section 22 are moved to extended position. A locking aperture 27 is formed through the solid rod section 22 for alignment with the apertures 17 and 11 formed respectively through the tubular sections 12 and 6.

A locking bolt 28 is provided for holding the three sections 6, 12 and 22 in telescoped position, and will be disposed through the aligned locking apertures 27, 17 and 11, and a nut 29 will be screwed on to the threaded end 30 of the locking bolt 28 to lock the extension tongue in telescoped position.

The rear end of the outer tubular section 6 will be welded at 31 or otherwise secured to a bracket 32 on the boat trailer chassis 4, and the solid rod section 22 will be formed with spaced apertures 34 through its front end for being connected with a trailer hitch 2 attached to the rear of a motor vehicle 3.

In operation, the sections of the tongue will be telescoped and securely locked by the bolt 28 when the motor vehicle 3 is pulling the boat trailer chassis 4. When the boat 5 supported upon the trailer chassis 4 is to be launched or removed from the water, the bolt 28 will be removed, whereupon the sections will be free to be extended to the position shown in Figures 2 and 4 of the drawings. Then tubular section 12 will be rotated ninety degrees to permit locking lugs 15 and 16 on section 12 to lock against shoulders 7 and 8 on section 6. Lugs 25 and 26 will lock against shoulders 18 and 19, thus keeping the tongue from telescoping when the trailer is backed into water. For hauling on road, section 12 is turned back ninety degrees, the tongue telescoped to the position in Figure 1 and pin 28 replaced.

From the foregoing description, it will be apparent that there has been devised and provided a highly efficient form of extension tongue for boat trailers which will be relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

An extension tongue for trailers comprising a series of concentrically arranged telescoping tongue sections, means at the forward end of said inner section and at the rear end of said outer section for attaching the same respectively to a motor vehicle and to a trailer, means for locking said sections in telescoped position, annular bearing rings on the innermost sections slidably engageable with the inner walls of the surrounding outer sections, said outer sections being formed with cooperating oppositely disposed annular locking shoulders at their forward ends and diametrically opposed slots between said shoulders, and said inner sections being formed with oppositely disposed lugs on their rear ends slidable through said opposed slots.

DEAN E. SWINEHART.

REFERENCES CITED

The following references are of record in the file of this patent:

UNITED STATES PATENTS

| Number | Name | Date |
|---|---|---|
| 1,563,860 | Jacobson | Dec. 1, 1925 |
| 2,179,439 | Trow | Nov. 7, 1939 |
| 2,409,662 | Christensen | Oct. 22, 1946 |